Patented Sept. 8, 1925.

1,553,266

UNITED STATES PATENT OFFICE.

HARLEY W. RHODEHAMEL, OF INDIANAPOLIS, INDIANA, ASSIGNOR TO ELI LILLY & COMPANY, OF INDIANAPOLIS, INDIANA, A CORPORATION OF INDIANA.

COMPOUND OF CINCHONA ALKALOIDS AND 2-PHENYL-QUINOLINE-4-CARBOXYLIC ACID.

No Drawing. Application filed April 18, 1921. Serial No. 462,346.

*To all whom it may concern:*

Be it known that I, HARLEY W. RHODE-HAMEL, a citizen of the United States, residing at Indianapolis, in the county of Marion and State of Indiana, have invented certain new and useful Improvements in Compounds of Cinchona Alkaloids and 2-Phenyl-Quinoline-4-Carboxylic Acid, of which the following is a specification.

I am aware that in United States Patent No. 1,213,464, Alex B. Davis describes compounds of 2-phenyl-quinoline-4-carboxylic acid with quinin and other cinchona alkaloids. However, the proportion in which the alkaloids unite with 2-phenyl-quinoline-4-carboxylic acid is not disclosed and the method described for the preparation of the compounds is not the most desirable manufacturing process. I have discovered that the cinchona alkaloids combine with 2-phenyl-quinoline-4-carboxylic acid in the proportion of one molecule of the alkaloid to one molecule of the acid and have found that these compounds can best be made by bringing together a mixture of 2-phenyl-quinoline-4-carboxylic acid in boiling alcohol and a solution of the alkaloid in warm alcohol.

In detail the process of preparing the quinin salt is as follows:

A mixture of 83 grams of 2-phenyl-quinoline-4-carboxylic acid and 800 c. c. alcohol is heated to boiling and into this is poured one-half of a warm solution of 126 grams quinin alkaloid ($C_{20}H_{24}N_2O_2+3H_2O$) in 400 c. c. alcohol.. The mixture is stirred until all the 2-phenyl-quinoline-4-carboxylic acid is dissolved then the remaining half of the alkaloid solution is quickly added. The quinin-salt crystallizes out of the alcohol in needles radiating from a common center. When separated from the mother liquor and dried, it is a white nearly tasteless crystalline powder, almost insoluble in water, decomposed by alkalies, soluble in hot acetone and alcohol. It has a melting point of 174° C.

Having thus fully described my said invention, what I claim as new and desire to secure by Letters Patent is:

1. A compound of a cinchona alkaloid and 2-phenyl-quinoline-4-carboxylic acid in which the alkaloid and the 2-phenyl-quinoline-4-carboxylic acid are united in molecular proportions.

2. Quinin 2-phenyl-quinoline-4-carboxylate.

In witness whereof, I have hereunto set my hand and seal at Indianapolis, Indiana, this 13th day of April, A. D. nineteen hundred and twenty-one.

HARLEY W. RHODEHAMEL. [L. S.]